United States Patent [19]

Karass

[11] 3,912,214
[45] Oct. 14, 1975

[54] HOOK AND HOOK ASSEMBLY USING A SLING OF BAND MATERIAL

[76] Inventor: Thomas John Karass, 411 Kindersley Ave., Mount Royal, Quebec, Canada

[22] Filed: Apr. 23, 1973

[21] Appl. No.: 353,567

[52] U.S. Cl. .................. 248/323; 248/340; 248/307
[51] Int. Cl.² ......................................... F16M 13/00
[58] Field of Search ........... 248/307, 323, 339, 340, 248/341

[56] References Cited
UNITED STATES PATENTS

| | | | |
|---|---|---|---|
| 1,313,807 | 8/1919 | Frazier | 248/339 |
| 3,007,666 | 11/1961 | Hamel | 248/317 |
| 3,139,260 | 6/1964 | Hamel | 248/340 |
| 3,143,329 | 8/1964 | Christopher | 248/317 |
| 3,288,414 | 11/1966 | Fortunato | 248/307 X |
| 3,297,290 | 1/1967 | Patterson | 248/307 X |

FOREIGN PATENTS OR APPLICATIONS

| | | | |
|---|---|---|---|
| 1,180,102 | 10/1964 | Germany | 248/307 |
| 129,682 | 10/1950 | Sweden | 248/307 |
| 852,516 | 10/1960 | United Kingdom | 248/307 |
| 225,611 | 9/1910 | Germany | 248/307 |

*Primary Examiner*—William H. Schultz

[57] ABSTRACT

A hook and a hook assembly adapted in particular to suspend a meat carcass using a sling made of band material. The hook includes a body having a suspending portion and a hooking portion defining a J configuration, a horizontally extending flat portion to flatly receive the sling, a protruding lip portion extending from the suspending portion and defining a lower straight edge overlying the flat portion and disposed below the tip of the hooking portion and defining a spacing between the suspending and hooking portions which is smaller than the width of the band material to prevent the sling from jumping off from the hook.

4 Claims, 17 Drawing Figures

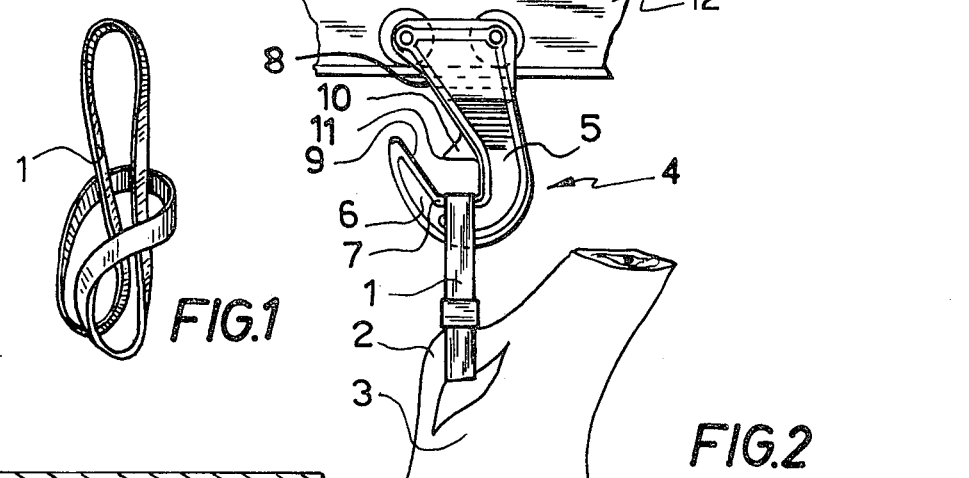
FIG.1
FIG.2
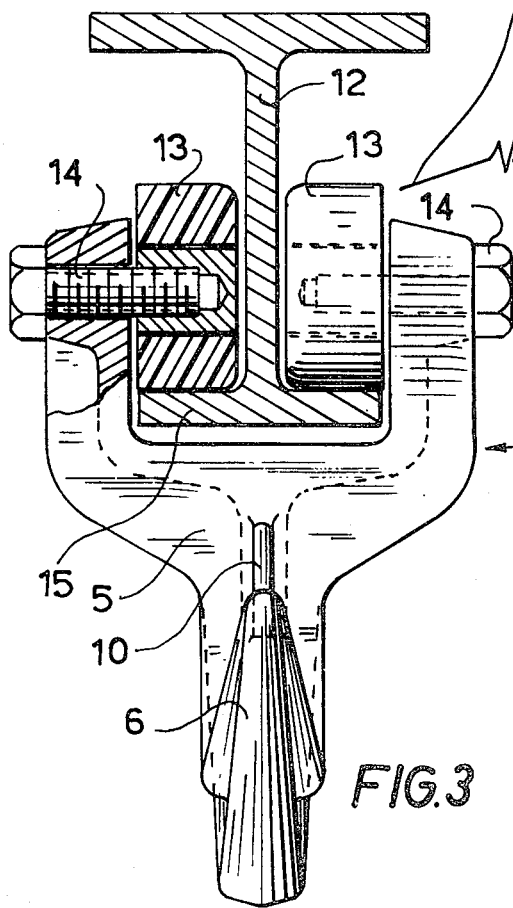
FIG.3
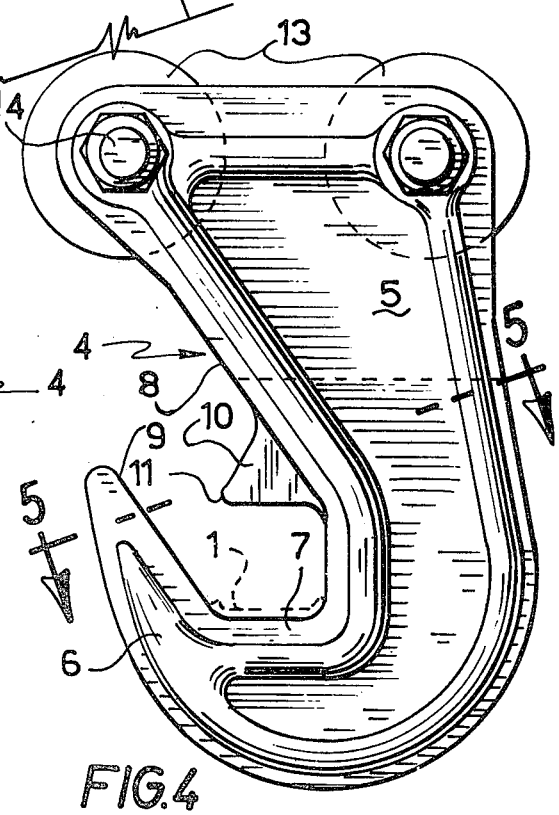
FIG.4

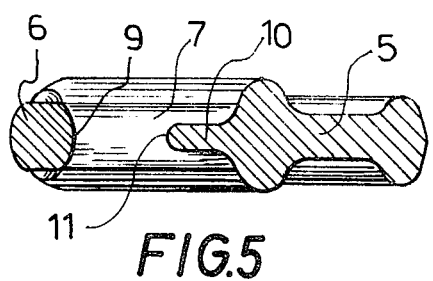
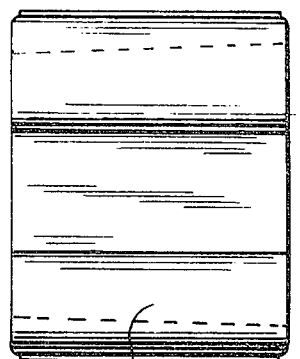
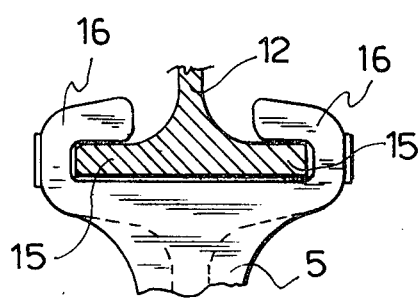
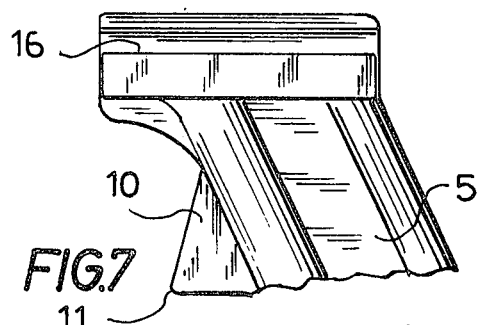
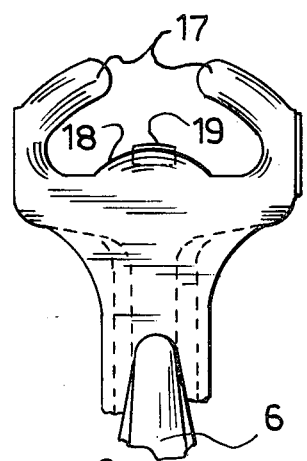
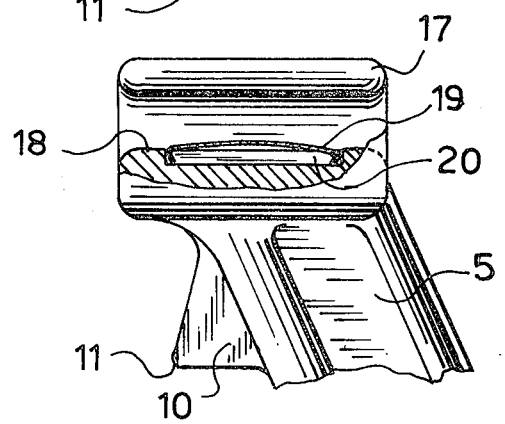
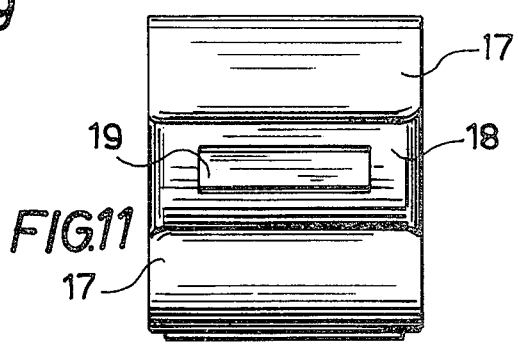

HOOK AND HOOK ASSEMBLY USING A SLING OF BAND MATERIAL

This invention relates to hooks and, more particularly, to a hook and a hook assembly of the type to hangingly support meat carcasses in railway cars and trucks.

The hooks of the above type which existed and have been used so far have been of S shape. Such S shape hooks are not found satisfactory to transport meat carcasses, since the latter are then allowed to fall off therefrom during transportation. This falling off is due in part to the shape of the hook which allows balancing of the suspended carcass and, in part, to the conventional manner of directly suspending the carcass by the hook.

The Applicant has conceived a new hook of the above type and a hook assembly which are particularly adapted to prevent the falling off of meat carcasses during transportation in railway cars and trucks. More particularly, the Applicant has noted that the manner of hooking and the form of the hook may be improved by indirectly suspending the meat carcasses by a sling of band material which engages a hook particularly adapted to support such sling and prevent accidental jumping of the latter.

It is therefore a general object of the invention to provide a hook assembly and a hook of the above type particularly adapted to prevent the falling off of meat carcasses during the transportation thereof.

It is a more specific object of the invention to provide a hook assembly using a sling of band material to suspend a meat carcass and a hook particularly constructed to support the sling of band material and prevent accidental jumping off therefrom.

It is a still further object of the invention to provide a hook of the above type which is adapted to be displaced along a supporting rail and transversely restrained relative to the latter and which includes a horizontally extending flat portion to support a sling of band material, mutually facing inner edges which upwardly extend from the opposite ends respectively of the flat portion, and a protuberant lip portion having a lower edge overlying and substantially parallel with the flat portion, and lying below the level of the tip of the hook, and forming a spacing between these edges which is smaller than the width of the band material, whereby to restrain the sling against jumping off from the hook.

The above and other objects and advantages of the invention will be better understood by reference to the following detailed description of preferred embodiments of the invention which are illustrated, by way of examples only, in the accompanying drawings, wherein:

FIG. 1 is a side elevation view of a sling of the band type as used with a hook according to the present invention;

FIG. 2 is a side elevation view of a hook assembly according to the invention using a sling of band material in operative engagement with a meat carcass;

FIG. 3 is an end view of the hook as seen from the left in FIG. 2;

FIG. 4 is a side view of the hook of FIGS. 2 and 3;

FIG. 5 is a cross-sectional view as seen along line 5—5 in FIG. 4;

Figure 12:
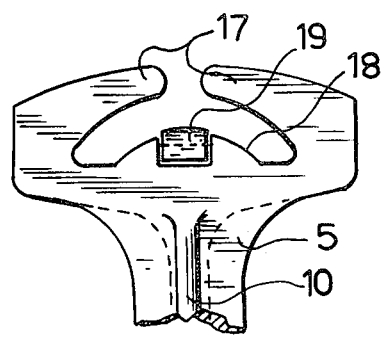
Figure 13:
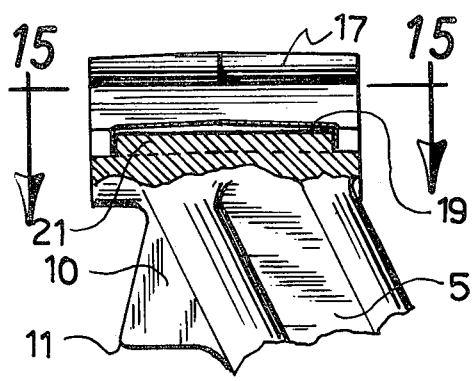
Figure 15:
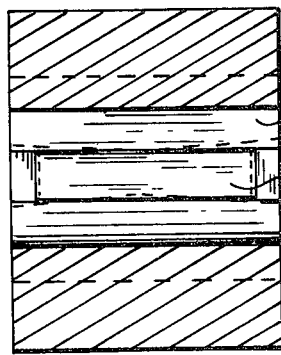
Figure 14:
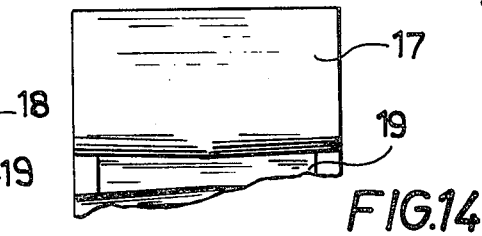
Figure 16:
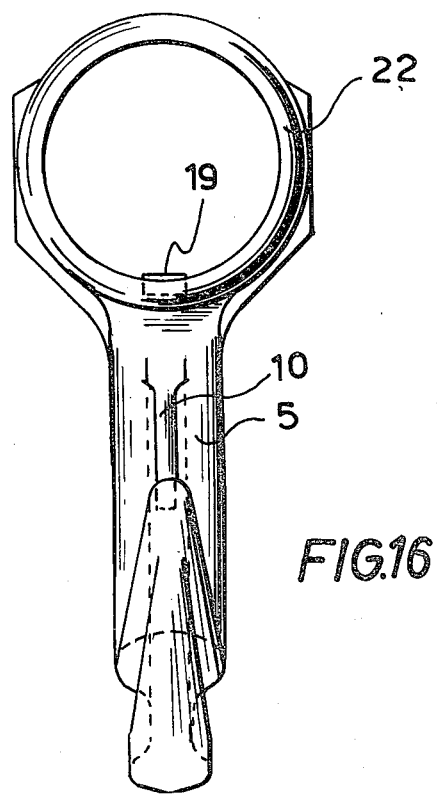
Figure 17:
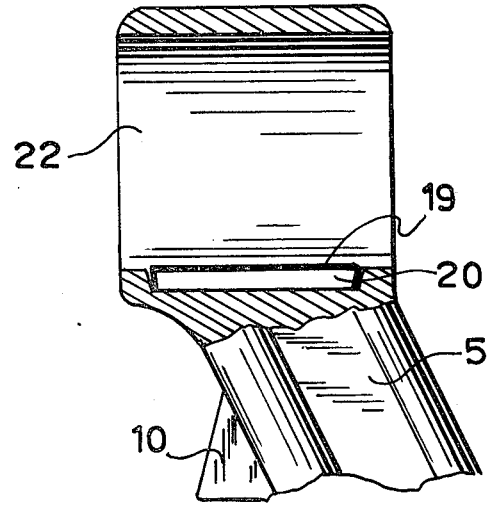

FIGS. 6, 7, and 8 are partial end, side and top views respectively of the upper portion of a hook according to a second embodiment of the invention;

FIGS. 9, 10, and 11 are partial end, side and top views respectively of the upper portion of a hook according to a third embodiment of the invention;

FIGS. 12, 13, and 14 are partial end, side and top views respectively of the upper portion of a hook according to a fourth embodiment of the invention;

FIG. 15 is a cross-sectional view as seen along line 15—15 in FIG. 13;

FIG. 16 is an end view of a hook according to a fifth embodiment of the invention; and FIG. 17 is a partial side view of the hook of FIG. 16.

The sling 1, illustrated in FIGS. 1 and 2 forms part of the hook assembly to be used with anyone of the hooks of the present invention. The sling 1 is made of band material, such as defined in one or the other of the two Canadian Pat. Nos. 818,310 and 889,808, granted to the present Applicant.

As best shown in FIG. 1, the sling 1 is attached by a knot around the hamstring 2 of a meat carcass.

A hook 4 according to a first embodiment of the invention, as well as the hooks of the other embodiments, includes a body having a suspending portion 5, an intermediate flat portion 7 and a hooking portion 6. The flat portion 7 is horizontally disposed and interconnects portions 5 and 6. As shown in FIG. 4, the length of the flat portion 7 of the hook is at least equal to the width of the band of material forming the sling 1. Preferably, the above length should be about the same as the width of the band material, such that the sling 1 flatly rests thereon without undue transverse sliding or displacement.

The suspending portion 5 and the hooking portion 6 have mutually facing edges 8 and 9 respectively which are spaced apart from each other and are similarly upwardly inclined relative to the flat portion 7, at opposite ends of the latter. A protuberant lip portion 10 projects away from the edge 8 of suspending portion 5 towards the edge 9 to form a spacing between the tip 11 of the lip and the edge 9 which is smaller than the width of the band material forming the sling 1. Furthermore, the lower edge of protuberant lip portion 10 is straight, parallel to and overlies the flat portion 7 but is disposed below the level of the uppermost point of hooking portion 6, such that during transportation, if the sling 1 jumps in the air, it is prevented from falling off the hooking porton 6 due to the afore-mentioned spacing and overlying relationship defined by the lip 10. To be inserted into the afore-mentioned spacing, the sling must be transversely twisted, what is unlikely to accidentally occur.

Preferably, as shown, the suspending portion, the hooking portion 6 and the lip portion 10 are integrally formed into a single body.

The upper or free end of the suspending portion 5 is provided with a rail engaging device which, in the first embodiment of FIGS. 2 to 5, is adapted to rollably engage a rail 12 having a I-shape cross-section. The rail engaging device of the first embodiment includes four wheels 13 held to the suspending portion 5, each by a bolt 14, such that these wheels 13 rollably engage the opposite flanges 15 of the I-shape rail 12.

In the second embodiment, illustrated in FIGS. 6, 7, and 8, the rail engaging device is formed by mutually facing bent flanges 16 integral with the suspending portion 5 and arranged to slidably engage the opposite flanges 15 of the I-shape rail 12.

In the third embodiment, illustrated in FIGS. 9, 10, and 11, the rail engaging device is formed by curved flanges 17 and face 18 adapted to engage similarly curved opposite flanges of an I-shape rail, not shown. A spring blade 19 is housed into a cavity 20 into the curved face 18 and outwardly bulges therefrom to frictionally bias and hold the hook along the rail.

In the fourth embodiment, illustrated in FIGS. 12 to 15 inclusive, the rail engaging device is as in the third embodiment, except for the spring blade 19 which, instead, engages over a raised portion 21 of suspending portion 5.

In the fifth embodiment illustrated in FIGS. 16 and 17, the rail engaging device is defined by a sleeve portion 22 integrally formed with the suspending portion 5 and arranged to slidably engage around a tubular or cylindrical rail. A spring blade 19 is also provided into a cavity 20, as in the third embodiment, to axially and radially retain the hook relative to the rail.

The hook is preferably made of a non-corrosive alloy or metal for safe use in the corrosive conditions encountered in refrigerated railway cars and trucks.

It must be noted that all the afore-described rail engaging devices prevent transverse balancing of the meat carcasses and thereby minimize the possiblities of hurting one another and falling off the hooks.

I claim

1. A hook for suspending a sling of band material therefrom comprising a suspending portion, an intermediate generally flat portion and a hooking portion joined together in a generally J-shaped configuration, said flat portion being as long as the width of said band material and interconnecting said suspending portion and said hooking portion, a protuberant lip portion attached to said suspending portion, positioned between said suspending portion and said hooking portion and forming a reduced spacing between the same which is smaller than the width of said band material, said protuberant lip portion having a lower edge which coextensively overlies said flat portion, which is lower than the uppermost point of said hooking portion, and which converges toward a point of the latter which is below the uppermost point.

2. A hook as defined in claim 1, further including track engaging means secured to said suspending portion and arranged to slidably support the latter from a track.

3. A hook as defined in claim 2, wherein said track-engaging means includes mutually facing flanges integrally formed with said suspending portion and arranged to slidably engage a pair of opposite flanges of an I-shaped rail.

4. A hook as defined in claim 2, wherein said track-engaging means includes mutually facing flanges integrally formed with said suspending portion and arranged to slidably engage a pair of opposite flanges of an I-shaped rail, mutually facing flanges integrally formed with said suspending portion and arranged to slidably engage a pair of opposite flanges of an I-shaped rail, and a spring blade mounted in a longitudinal cavity made at the inside face of said mutually facing flanges and frictionally engageable with said rail.

* * * * *